Figure 1:
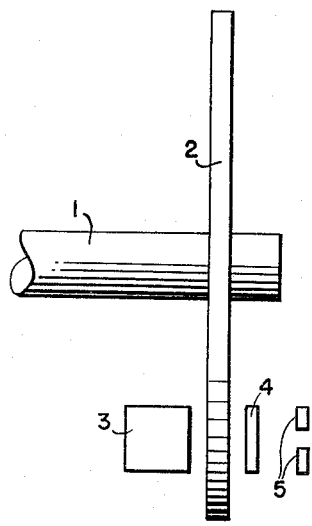

July 5, 1960   J. H. L. McAUSLAN ET AL   2,944,157
SHAFT-POSITION DETERMINING APPARATUS
Filed Nov. 22, 1954   3 Sheets-Sheet 1

INVENTORS
James H.L. McAuslan
William Nock

BY Cushman, Darby & Cushman

ATTORNEYS

July 5, 1960 J. H. L. McAUSLAN ET AL 2,944,157
SHAFT-POSITION DETERMINING APPARATUS
Filed Nov. 22, 1954 3 Sheets-Sheet 3
FIG. 7C.
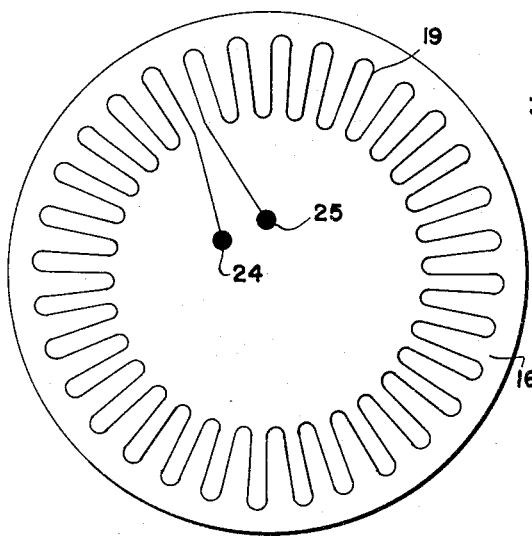
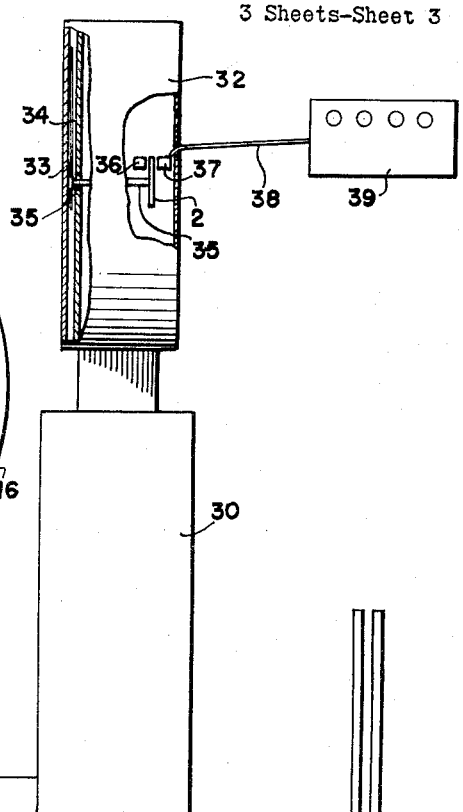
FIG. 8.
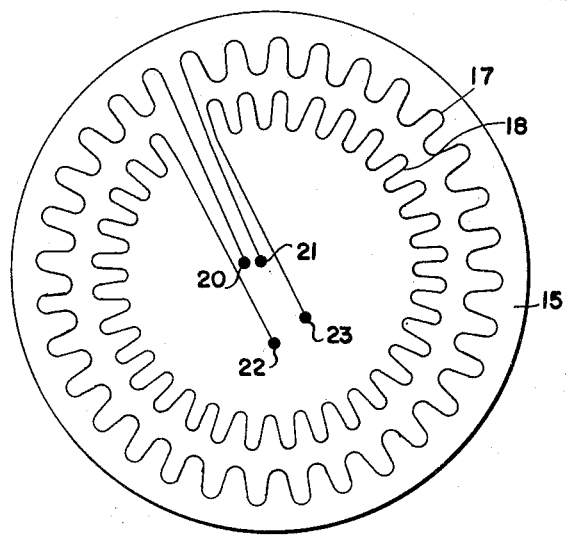
FIG. 7B.
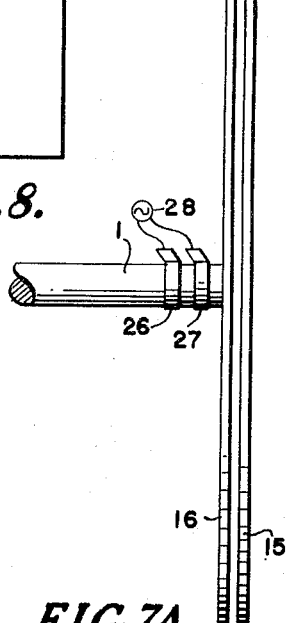
FIG. 7A.
INVENTORS
James H.L. M<sup>c</sup>Auslan
William Nock
BY Cushman, Darby & Cushman
ATTORNEYS

United States Patent Office 2,944,157
Patented July 5, 1960

2,944,157

SHAFT-POSITION DETERMINING APPARATUS

James Hay Loudon McAuslan, Port-Glasgow, and William Nock, Saltcoats, Scotland, assignors to Imperial Chemical Industries Limited, London, England, a corporation of Great Britain Filed Nov. 22, 1954, Ser. No. 470,440

Claims priority, application Great Britain Nov. 30, 1953

16 Claims. (Cl. 250—233)

This invention relates to an improved apparatus for deriving positional information from any movement that can be represented by rotational movement, for example, the movement of the pointer bearing spindle of a weighing machine.

The movement of a rotating shaft may conveniently be measured by converting the movement of the shaft into electric pulses and passing the pulses into a counter of known type where they are recorded or indicated. The movement may be converted into electric pulses by various methods, e.g. by causing a beam of light to be interrupted as the shaft rotates by a disc carrying a grid so that the number of interruptions is proportional to the movement of the shaft, the interrupted beam of light falling on a photoelectric cell, and the pulses thus formed being suitably amplified to provide pulses which may be counted. A stationary similarly apertured grid is conveniently placed between the moving grid and the photoelectric cell to provide a gate. Alternatively, the pulses may be formed electromagnetically, e.g. by the movement of a disc carrying a peripheral zig-zag of conductive material concentric with its axis, the material carrying a high frequency alternating electric current and being in close proximity to a similar stationary arrangement of conductive material which receives pulses as lines of the material pass one another. Pulses may also be derived electrostatically, e.g. by an arrangement in which the movement of a rotating member varies the capacity between it and a stationary member. Such grids and conductive discs are conveniently produced by photo etching. Unless it is possible to differentiate between the pulses emitted when the shaft is going forwards and when it is reversing, such methods are not suitable for determining the positions of shafts which may reverse or hunt, since the total movement of the shaft would be recorded or indicated, that is the reverse as well as the forward movement of the shaft, and this would introduce serious error.

It has been proposed to provide reversible counters by creating pulses 90° out of phase and, since the phase relationship changes with direction of rotation, the second signal is used to prepare gates in the counter causing it to subtract when the pulse generator reverses direction. This method of operation suffers from the disadvantage that cumulative inaccuracy is possible if the shaft oscillates, e.g. hunts or vibrates.

Particularly useful counters for counting pulses and which may be made to operate reversibly are polycathode gas-filled tube counters. As each pulse is fed into the counter a flow of electricity between the anode and a cathode of the counter ceases, and is replaced by a flow of electricity between the anode and an adjacent cathode. The flow of electricity is indicated by a local glow in the region of the cathode on to which the electricity flows. For convenience this change in direction of the flow of electricity is referred to hereinafter as the movement of the glow. This movement is achieved by the manipulation of the voltage on pairs of guides between each cathode, alternate guides being connected together. The guides are normally at a higher potential than the cathode and thereby localise the glow upon a particular cathode. With each pulse the potential of the guides to one side of the cathodes is depressed to below that of the cathodes and then this potential depression is transferred to the other guides. In this way, with each pulse, the flow of electricity is transferred from the cathode, to which it flowed, to one guide then the next and, with the termination of the pulse, to the next cathode. Delaying circuits are normally used between the guides to provide the necessary time sequence for pulses. The guides to which pulses are first directed when the count is advanced are hereinafter referred to as the first guides and the other guides are hereinafter referred to as the second guides. It will be appreciated that by reversing charges, such polycathode counters may be used as polyanode counters, and it is to be understood that such reversal of charges is within the intention of the invention described hereinafter.

The counters may be set to zero by momentarily giving the cathode representing zero in each counter a negative charge greater than its normal value.

According to the present invention we provide an apparatus for detecting the movement and position relative to a determined point, of a rotatable shaft, said apparatus comprising means operated by rotation of the shaft which causes pairs of electrical pulses to be emitted according to a set pattern, the pulses being if desired passed through amplifying or shaping circuits, in which pattern, when the shaft is rotated in one direction, a first pulse is emitted in a pulse emitting means or circuit and a second pulse is emitted in a second pulse emitting means or circuit, the second pulse beginning before the first pulse ends so that it lags behind and partially overlaps the first pulse, the second pulse being followed by a time interval before the next pair of overlapping pulses is emitted, the pattern being reversed when the shaft is rotated in the opposite direction, said pulses being fed to a polycathode gas-filled tube counter, pulses from one pulse emitting means or circuit being always fed to one guide of the counter and pulses from the other pulse emitting means or circuit being always fed to the other guide of the counter. Where the speed of rotation of the shaft may vary it is preferred that the pulses are emitted in such a way, that when the shaft stops rotating the appropriate guide is energised for as long as the shaft is in the associated position. For example, if the shaft stops rotating under conditions of operation in a position in which one guide is energised, that guide will remain energised, and the glow will remain on that guide until the shaft starts to rotate again.

In order that our invention may be more fully understood, a specific embodiment will be described.

Figure 2:
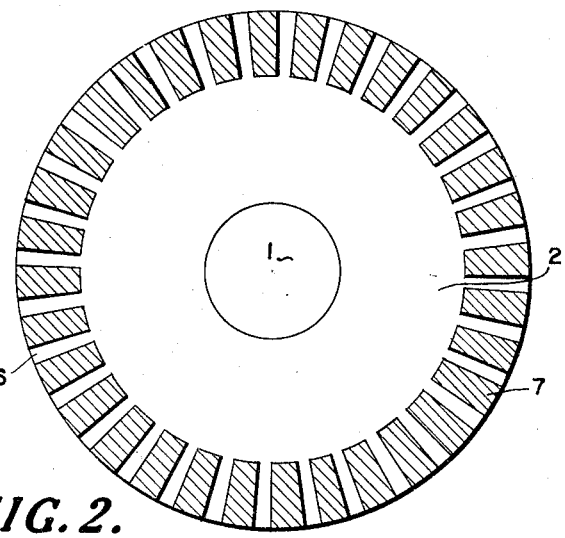
Figure 3:
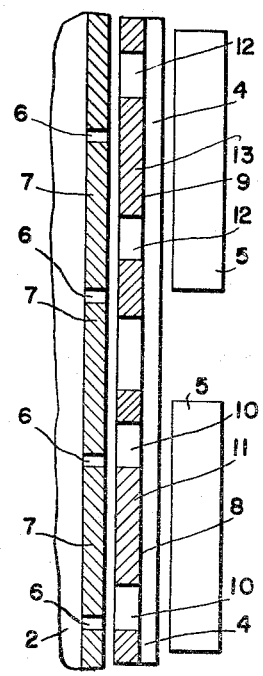
Figure 4:
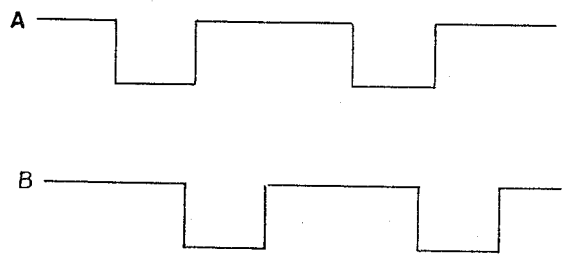
Figure 5:
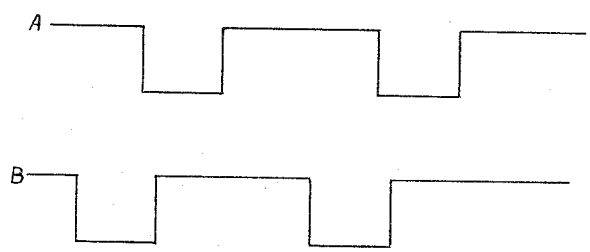
Figure 6:
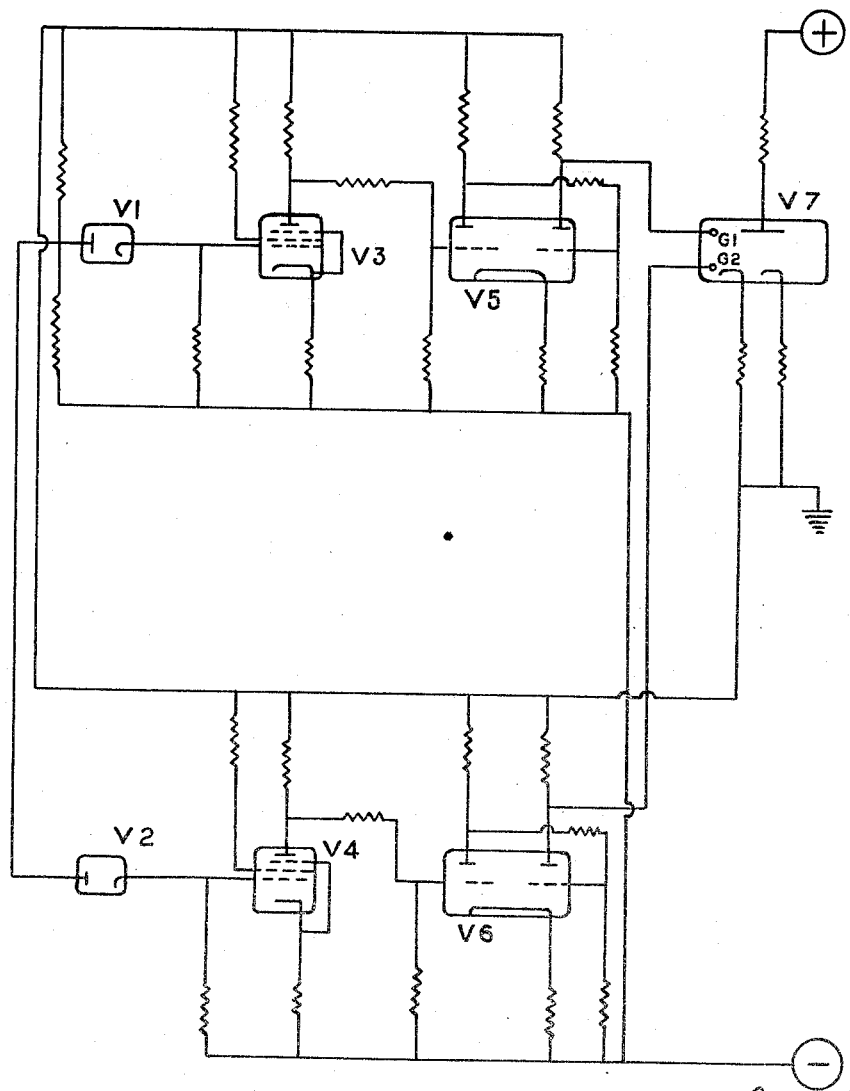

Figures 1, 2 and 3 illustrate diagrammatically an optical system used to generate pulses. These illustrations are serially on increasingly larger scales. Figures 4 and 5 illustrate the pulse patterns fed into the counter which are generated when the shaft is rotating at a steady speed in one case in one direction and in the other case in the opposite direction. Figure 6 shows the pulse counting circuit. Figures 7a, 7b, and 7c illustrate an electromagnetic arrangement for generating pulses. Figure 8 illustrates a conventional weighing machine equipped with pulse generating apparatus.

The shaft 1 (Figure 1) whose angular movement it is desired to determine carries a transparent disc 2, e.g. of glass or plastic material so that as the shaft rotates the disc rotates correspondingly. The disc is mounted so that its centre of rotation corresponds with the axis of rotation of the shaft and both the shaft and the disc move with the same angular velocity; if desired the disc may be mounted in a different position and connected by gear wheels to the shaft so that it moves at a greater or smaller angular velocity than the shaft as desired. The disc 2 carries opaque radial markings 7 which may be etched or photographed on to the disc and which are separated by transparent portions 6 and, for purposes hereinafter described, the ratio of the width of the transparent portions to the opaque portions are 1 to 14. On one side of the disc is a source of parallel light 3 and on the other side two photosensitive devices both shown at 5, e.g. photoelectric cells, with a gate 4 between the disc and each photosensitive device.

Figure 3 illustrates the gate 4, and also illustrates the disposition of the markings on the gate with respect to the markings on the disc when viewed from the side upon which the photosensitive devices are placed. The diagram shows a portion of the periphery of the disc 2 having, for convenience in illustration, an infinitely large radius, and the gate lying beside the periphery of the disc. It will be appreciated that in practice, the diameter of the disc need not be large and may for example be about 5", and the gate will be placed so that as the disc makes a full revolution, each transparent and opaque portion of the disc traverses all the transparent and opaque portions of the gate. The gate 4 has two sets of markings which are shown at 8 and 9, 8 comprising alternate transparent and opaque portions 10 and 11, and 9 comprising alternate transparent and opaque portions 12 and 13. For convenience, Figure 3 shows only two transparent portions 10, and two transparent portions 12. In practice, the gate preferably contains a large number of alternate transparent and opaque portions 10 and 11 and 12 and 13 in order to pass the maximum amount of light on to the photosensitive device. The markings on the disc and on the gate as herein described and the disposition of the various sets of markings to each other, are so arranged that when the disc is rotating uniformly, the periods during which either cell is illuminated, and the periods during which neither cell is illuminated, are approximately the same, and that consequently the glow rests on each electrode of the polycathode gas-filled tube counter, that is its guides and cathodes, for approximately the same length of time. Such a method of working is preferred because the best performance of the counter is thereby obtained. The transparent portions 10 are each four times the width of the transparent portions 6 on disc 2, and the opaque portions 11 are correspondingly narrower so that the total width of 10 plus 11 is the same as the total width of 6 plus 7. The portions 12 and 13 have the same widths as the corresponding portions 10 and 11. The two sets of markings 8 and 9 are so placed relatively to each other in the direction of rotation of disc 2 as shown in Figure 3, that points on 8 are separated from corresponding points on 9 by a multiple of the width of 6 plus 7 plus an amount corresponding to the width of a portion 10 plus ¾ of the width of a portion 6. The two photosensitive devices 5 are shown one behind the set of markings 8 and one behind the set of markings 9 of gate 4.

As the disc rotates anticlockwise, when viewed from its side upon which the photoelectric cells are placed, from the position shown in Figure 3 in which the transparent portions 10 of the gate are being traversed by portions 6 of the disc, the portions 12 of the gate are being traversed by the opaque portions 7 of the disc; the first photosensitive device is thus illuminated while the second is not, until the transparent portions 6 on the disc start to move across the transparent portions 12 of the gate just before the portions 6 have fully traversed the portions 10, when both photosensitive devices are illuminated. With the arrangement illustrated, both photosensitive devices are simultaneously illuminated for a period of time which is approximately ¹⁄₂₀ of the total time that one photosensitive device is illuminated when the disc is rotating uniformly. As the opaque portions 7 of the disc move across the transparent portions 10 of the gate the second photosensitive device only is illuminated until continued rotation causes both sets of transparent portions 10 and 12 on the gate to be covered by opaque portions on the disc. After further rotation the transparent portion of the disc starts to move once more across the transparent portions 10 of the gate and the pattern is repeated. When the disc moves in the opposite direction a similar sequence of events occurs, but this time the overlap occurs as the traversing of portions 12 is being completed and the traversing of portions 10 is starting.

Figures 4 and 5 illustrate the patterns of amplified and shaped pulses which are generated when the disc rotates in one direction and then in the reverse direction, A representing the pulses derived from the signal generated by the first photosensitive device and B representing the pulses derived from the signal generated by the second photosensitive device. As can be seen from these figures, the negative pulses which correspond with illumination of the photosensitive devices overlap by approximately ¹⁄₂₀ of their length. From Figure 4 it can be seen that the pulse pattern is a pulse from A, which overlaps with a pulse from B, followed by a period in which there is no pulse, and then a repetition of the pattern. Figure 5 shows a similar pattern with the pulse from B preceding that from A. Figures 4 and 5 also show that the time of duration of each pulse, and the time during which there is no pulse, are approximately the same. This means that when the disc is rotating uniformly the glow in the counter rests on each electrode, that is its guides and cathodes, for approximately the same time.

The amount of overlapping of the pulses and the time interval between the pulses for a particular rate of rotation of the disc, may be controlled by adjustment of the relative widths of the two sets of opaque and transparent portions on the gate and on the disc and their relative positions. It will be appreciated that our preferred pulse pattern may be generated by arrangements of markings, different from those particularly described. It will also be appreciated that other optical arrangements may be made to obtain our pattern of overlapping pulses. For example, gates need not be used, the opaque portions on the disc may be wider than the photosensitive devices which are disposed so that when a transparent portion of the disc is directly opposite one photosensitive device, the other photosensitive device is partly covered by an opaque portion and partly by a transparent portion, and also so that as the disc rotates both photosensitive devices are at one stage covered by opaque portions. We prefer, however, to use a gating arrangement, since by such a means the markings on the disc are not limited in size and number by the size of the photosensitive devices. Since a pulse is generated each time a transparent portion of the disc moves across a transparent portion of the gate, the number of pulses emitted per unit angular displacement of the disc can be increased by increasing the number of markings on the disc (and correspondingly on the gate).

The pulses are preferably amplified and squared and the negative squared pulses thus obtained are fed into a counter comprising polycathode gas-filled tubes. The pulses from the first photosensitive device are fed to the first guide of the first counter and the pulses from the second photosensitive device fed to the second guide of the first counter. By this means, as the shaft rotates in the direction in which the pulses are to be added, overlapping pairs of pulses as illustrated in Figure 4 are emitted and the first pulse of each pair is arranged to reach the first guide first and therefore cause the counter to add. When the shaft moves in the reverse direction the first pulse of each pair of overlapping pulses reaches the second guide first and therefore causes the counter to subtract.

Figure 6 is a circuit diagram which shows the method by which the pulses from the photosensitive devices are fed into the polycathode counter. In the diagram V1 and V2 are the photosensitive devices, V3 and V4 are conventional pentode amplifiers, V5 and V6 are conventional D.C. coupled double triode trigger circuits, and V7 is a polycathode tube counter for unit counting.

The pulses from V1 are fed to the amplifier V3 and the output from the amplifier is fed to the shaper V5. The negative squared pulses derived from V5 are fed to G1 which is the first guide of the counter V7. Pulses from V2 are similarly treated and fed to G2 which is the second guide of the counter V7.

If a sufficiently strong signal is available from the photosensitive devices either the amplifiers V3 and V4 or the circuits V5 and V6 may be dispensed with. Thus, under these conditions the amplifiers will each provide a negative squared pulse to drive the counter V7. Alternatively, in the arrangement described V5 and V6 could be run directly from V1 and V2 by feeding the photocell output to the right hand grid of the appropriate circuit V5 or V6; or, by interchanging each photocell with its cathode resistor, the output from each photocell can be fed to the left hand grid of the appropriate circuit V5 or V6. In general, however, it is found advantageous to use both amplifiers and shaping circuits to derive the signal for driving the counter.

The overlapping pairs of pulses may also be obtained electromagnetically by a modification of the means described, in which a moving conductive disc is in close proximity to two stationary, concentric arrangements of conductive material, one forming a peripheral zig-zag, e.g. the conducting path being adjacent the periphery of a disc and arranged to follow the radii so that current changes direction from one radial section to the next, and the other having a similar shape but lying within the circle of, and out of contact with the first, the zig-zag of one being displaced slightly radially from that of the other. Figures 7a, 7b, and 7c illustrate an arrangement of this kind. In Figure 7a, the shaft 1 carries a non-conducting disc 16 shown in side elevation. There is a second non-conducting disc 15 fixedly mounted in any desirable manner near the disc 16. A front view of disc 16 is shown in Figure 7c; 19 is an electrical conductor arranged in a radial zig-zag as shown having two terminals 24 and 25 that are connected through the slip rings 26 and 27 (Figure 7a) to a source of high frequency alternating current 28. The front view of the fixed disc 15 is shown in Figure 7b; disc 15 has two electrical conductors 17 and 18 each arranged in a radial zig-zag pattern, each conductor having the same number of radial lines as the conductor 19. The two conductors 17 and 18 are displaced slightly with respect to each other so that the conductors lie on different radii. These conductors are connected at their ends to two sets of terminals 20, 21 and 22, 23 respectively. These sets of terminals are then coupled to guides G1 and G2, respectively, instead of the photosensitive tubes VI and V2, through the respective amplifying and shaping circuits, if desired. The pulse outputs of each conductor resulting by induction when there is relative movement between discs 15 and 16, are therefore overlapping and non-existent to a predetermined extent in the same way, as previously described. For clarity in the drawings, the discs are shown with relatively few radial lines forming the conductors; in practice it is desirable to arrange the conductor so that there are several hundred radial lines for each conductor. In an arrangement of this kind it is necessary that the output should be rectified and, where there is a high frequency carrier component, this should be removed before the pulses are fed to the counters.

Our apparatus has many useful important applications, for example, it may be used to indicate and/or record the length of material, e.g. paper, cloth or film, passing over a roll, or to indicate and/or record the movement of a shaft from one point to another point as, for example, in a weighing machine. It will be appreciated that our apparatus may be made to provide a desired indication or record remotely from the rotating shaft, and this may be an advantage, e.g. in the weighing of dusty materials where it is desired to operate the counter in a dust-free atmosphere.

The polycathode gas-filled tube counters may be connected to a printer by making connections from the cathodes to the circuits of an electrically or electronically operated printer. By this means a printed record may be provided at any desired time, e.g. when the shaft has ceased to move and is in a state of equilibrium.

In using our apparatus in combination with a weighing machine the pointer may be replaced by a disc as hereinbefore described or the shaft may carry both the pointer and the disc. Since the disc need be no more than about 5" in diameter it can be made very light in weight so that there is no hindrance to the free working of the weighing machine. Figure 8 illustrates a side elevation of a conventional automatic weighing machine fitted with the pulse generating means and connected to a polycathode or polyanode gas-filled tube counter as hereinbefore described. The body of the weighing machine is shown at 30, the platform at 31 and the casing covering the headwords at 32. Part of the casing is shown removed to reveal the pointer 33 mounted on the shaft 35, and scale 34. Part of the casing is also removed at the back to show the other end of shaft 35 having mounted on it the graduated disc 2. On one side of disc 2 is diagrammatically shown a lamp carrying mounting 36 which may be held in position in any suitable manner as by bracketing to the casing. On the other side of disc 2 is diagrammatically shown another mounting 37 which may be similarly bracketed to the casing; this mounting 37 carries the gate and photocell arrangement illustrated at 4 and 5 in Figure 1. The polycathode gas-filled tube counter is shown at 39 connected by the cable 38 to the photocell mounting 37. Alternatively, our apparatus may be used in combination with the weighing equipment described in the copending Kennaway et al. applications Serial Nos. 336,847 and 336,848, both filed February 13, 1953, to provide improved equipment for determining gross, tare and net weights. Our apparatus makes it possible to provide improved weighing equipment which may hunt at the point of equilibrium without introducing errors into the indicated or recorded weight.

What we claim is:

1. Apparatus for detecting the movement and position of a rotatable shaft, comprising means for producing a first signal and a second signal, means operative upon rotation of said shaft for causing the first signal to begin before the second signal during rotation of the shaft in one direction and for causing the second signal to begin before the first signal during rotation of the shaft in the opposite direction, said last mentioned means including means for causing overlap to a predetermined extent of only the earlier occurring one of said signals with the later occurring one of said signals, and a counting tube having a plurality of first elements, a second element disposed in current conducting relation with each of said first elements and two guide means for transferring current conduction from between said second element and one of said first elements to another of said first elements and said second element, said first signal being coupled to one of the guide means and said second signal being coupled to the other of the guide means, said guide means receiving said signals respectively with substantially the same overlap therebetween as caused by the overlap causing means, said counting tube being operative to reversibly count up or down in response only to said first and second signals, without aid of derivatives thereof, in accordance with the order of the first and second signals as received by said two guide means, the arrangement being such that rotation of said shaft in one direction causes transfer of current conduction to an adjacent one of said plurality of first elements in one direction, while rotation of the shaft in said opposite direction causes transfer of current conduction in an adjacent one of said plurality of first elements in another direction.

2. Apparatus as in claim 1 wherein the first and second signal producing means includes two photosensitive devices and a source of light directed thereto, and wherein said means operative upon rotation of said shaft includes a movable member having alternate transparent and opaque portions, said member being coupled to the shaft and disposed for interrupting by said opaque portions the light of said source to the photosensitive devices, respectively.

3. Apparatus as in claim 1 wherein the first and second signal producing means includes two concentric elements of conducting material each element being stationary with respect to the other, one forming a peripheral zig-zag and the other having a similar shape lying within the circle of and out of contact with the first, one of said elements having its radial conducting paths displaced in relation to the other, and wherein said means operative upon rotation of said shaft includes a third concentric peripheral zig-zag element of conductive material coupled to said shaft and adjacent to said two conductive elements, and a high frequency alternating current source connected to said third concentric element, whereby rotation of the third zig-zag element induces current in said two zig-zag elements to produce said first and second signals.

4. Apparatus as in claim 1 wherein the means for causing overlap of said signals produces an overlap small compared with the length of the signals, and wherein the means for producing a first and second signal causes the time duration of either of said signals and the time interval between successive sets of overlapping first and second signals to be substantially equal so that when the shaft rotation speed is substantially uniform the duration of current conduction as between said second element and each of said first elements and guide means is approximately equal.

5. Apparatus as in claim 1 and further including amplifying means for amplifying said first and second signals and coupling same respectively to the guide means.

6. Apparatus as in claim 1 and further including pulse shaping means for shaping said first and second signals and coupling same respectively to the guide means.

7. Apparatus as in claim 1 and further including weighing equipment comprising a platform and means responsive to weight placed upon said platform for rotating said shaft in proportion to the weight whereby said counting tube indicates amount of weight placed upon said platform.

8. Apparatus according to claim 1 in which said movable member is a disc, having alternate transparent and opaque portions adjacent its periphery.

9. Apparatus according to claim 8 comprising in addition a light gate positioned between the source of light and said photosensitive devices and having alternate transparent and opaque portions.

10. Apparatus for use with a counting tube which has a plurality of first elements, a second element disposed in current conducting relation with each of said first elements, and two guide means for transferring current conduction forwardly to a first element adjacent in one direction or backwardly to a first element adjacent in another direction in accordance with whether a first of the two guide means receives a signal before the second guide means or vice versa, said apparatus comprising means for generating at least one pulse A and at least one pulse B and determining whether said current conduction should be forwardly or backwardly by causing the A pulse to begin before the B pulse for current conduction transfer in one of said directions and by causing the B pulse to begin before the A pulse for current conduction transfer in the other of said directions, said last mentioned means including means for causing the earlier occurring one of said pulses to overlap the later occurring one thereof to a predetermined extent which is less than the duration of either of said pulses, and means for coupling the A and B pulses respectively to said two guide means with substantially the same overlap therebetween as caused by the overlap causing means for making the counting tube reversible count up or down in response only to said A and B pulses, without aid of derivatives thereof, in accordance with the order of the A and B pulses as received by the two guide means.

11. Apparatus as in claim 10 wherein the generating means produces a plurality of spaced sets of overlapping A and B pulses and determines for each set of pulses whether the A or B pulse therein begins first, the time interval between the ending of the later occurring pulse in one set and the beginning of the earlier occurring pulse in the next set when the same A or B pulse begins first in said one and next sets being substantially equal to the time duration of either the A or B pulse in at least said one set when the said one and next sets are included in a group of sets produced by the generating means at substantially the same rate.

12. In combination with a counting tube having a plurality of first elements, a second element disposed in current conducting relation with each of said first elements, and two guide means for transferring current conduction forwardly to a first element adjacent in one direction or backwardly to a first element adjacent in another direction in accordance with whether a first of the two guide means receives a signal before the second guide means or vice versa, means for generating two separate trains of pulses, each different pulse in one train having a respectively corresponding pulse in the other train with any two such pulses being a set, means for coupling the pulse trains respectively to said two guide means, means for causing each set of pulses as received by the guide means to variously have one or the other of its pulses begin first and overlap its later occurring pulse according to whether current conduction transfer is to be forward or backward, and means forming part of said coupling means for causing current conduction to remain on the guide means that has last received the non-overlapping portion of a pulse when the generating means stops until said pulse regardless of its duration is ended, whereby the counting tube is accurately reversibly operated in response only to said trains of pulses without aid of derivatives thereof.

13. In combination with a counting tube having a plurality of first elements, a second element disposed in current conducting relation with each of said first elements, and two guide means for transferring current conduction forwardly to a first element adjacent in one direction or backwardly to a first element adjacent in another direction in accordance with whether a first of the two guide means receives a signal before the second guide means or vice versa, means for generating at least one pulse A and at least one pulse B and determining whether said current conduction should be transferred forwardly or backwardly by causing the A pulse to begin before the B pulse for current conduction transfer in one of said directions and by causing the B pulse to begin before the A pulse for current conduction transfer in the other of said directions, said last mentioned means including means for causing the earlier occurring one of said pulses to overlap the later occurring one thereof to a predetermined extent which is less than the duration of either of said pulses, and means for coupling the A and B pulses respectively to said two guide means with substantially the same overlap therebetween as caused by the overlap causing means to make the counting tube reversibly count up or down in response only to said A and B pulses, without aid of derivatives thereof, in accordance with the order of the A and B pulses as received by the two guide means.

14. Apparatus as in claim 13 wherein the generating means produces a plurality of spaced sets of A and B pulses and determines for each set of pulses whether the A or B pulse therein begins first, the time interval between the ending of the later occurring pulse in one set and the beginning of the earlier occurring pulse in the next set when the same A or B pulse begins first in said one and next sets being substantially equal to the time duration of either the A or B pulse in at least said one set when the said one and next sets are included in a group of sets produced by the generating means at substantially a uniform rate, and wherein the overlap causing means produces an overlap of the pulses in each set which overlap is small compared to the length of at least the earlier occurring pulse.

15. Apparatus as in claim 13 wherein the coupling means includes means for independently amplifying the A and B pulses.

16. Apparatus as in claim 13 wherein the coupling means includes means for independently shaping the A and B signals.

References Cited in the file of this patent

UNITED STATES PATENTS

| | | |
|---|---|---|
| 1,618,757 | Hoxie | Feb. 22, 1927 |
| 2,439,735 | Homrighous | Apr. 13, 1948 |
| 2,479,802 | Young | Aug. 23, 1949 |
| 2,537,427 | Seid et al. | Jan. 9, 1951 |
| 2,604,004 | Root | July 22, 1952 |
| 2,605,694 | Moss et al. | Aug. 5, 1952 |
| 2,656,106 | Stabler | Oct. 20, 1953 |
| 2,685,082 | Beman et al. | July 27, 1954 |
| 2,714,179 | Thomas et al. | July 26, 1955 |